United States Patent
Bowe et al.

(10) Patent No.: US 7,241,819 B2
(45) Date of Patent: Jul. 10, 2007

(54) METHOD OF LEVELLING A FLOOR

(75) Inventors: Michael Damian Bowe, Doylestown, PA (US); Bernadette Rufo Corujo, Newtown Square, PA (US); Yves Louis Vandenberghe, Le Rouret (FR)

(73) Assignee: Rohm and Haas' Company, Philadelphia, PA (US)

( * ) Notice: Subject to any disclaimer, the term of this patent is extended or adjusted under 35 U.S.C. 154(b) by 456 days.

(21) Appl. No.: 10/894,908

(22) Filed: Jul. 20, 2004

(65) Prior Publication Data

US 2005/0020736 A1    Jan. 27, 2005

(30) Foreign Application Priority Data

Jul. 25, 2003   (EP)   ................... 03291856

(51) Int. Cl.
*C04B 24/26*   (2006.01)
(52) U.S. Cl. ............... 524/5; 524/4; 427/403
(58) Field of Classification Search ................ 524/4–5; 427/403
See application file for complete search history.

(56) References Cited

U.S. PATENT DOCUMENTS 5,653,797 A * 8/1997 Patel .......... 106/781
5,746,822 A * 5/1998 Espinoza et al. .......... 106/785

FOREIGN PATENT DOCUMENTS

| DE | 44 04 182 A | | 8/1995 |
|---|---|---|---|
| EP | 0 562 651 | * | 3/1993 |
| EP | 1 316 537 A | | 6/2003 |
| WO | WO 99/48833 | * | 9/1999 |

* cited by examiner

*Primary Examiner*—Peter Szekely
(74) *Attorney, Agent, or Firm*—Ronald D. Bakule; Leah M. Reimer

(57) ABSTRACT

A two-pack cementitious composition consisting of
- iii) an alkaline component comprising gypsum, an alkaline polymer, water and a hydration inhibitor, which is stable in a fluid state and which can be set and hardened upon the addition of an hydration activator, and
- iv) an acidic component comprising an acid soluble hydration activator, is suitable for forming a self-levelling floor composition. The self-levelling floor composition may be used in a method of levelling a floor.

10 Claims, No Drawings

METHOD OF LEVELLING A FLOOR

CROSS REFERENCE TO RELATED PATENT APPLICATIONS

This is a non-provisional patent application of European patent application No. 03291856.7 filed Jul. 25, 2003.

This invention is concerned with a method of levelling a floor. In particular, the invention concerns the use, in a method of levelling a floor, of a two-pack cementitious composition consisting of a first component comprising gypsum, water and a hydration inhibitor, which is relatively stable in a fluid state and which can be set and hardened upon the addition of an hydration activator, and a second component comprising an hydration activator, as a self-levelling floor composition.

During the construction of a building, it is typical to prepare a floor from a plurality of layers. For example, a floor of a house or office may be made up from a bottom, hard core layer overlaid with a coarse concrete layer which, in turn, is then overlaid with a bituminous waterproofing layer, a thermal insulating layer, and a finer concrete top layer. A coating of self-levelling floor composition is then usually applied over the concrete top layer, thereby to provide a level surface onto which a carpet, linoleum or other floor covering may be laid.

Self-levelling floor compositions usually comprise cement and fine sand mixtures, and are typically provided in the form of a powder for admixture on-site with an appropriate amount of water. After mixing with an appropriate amount of water, the resulting thin slurry is then e.g. poured or sprayed on to the top concrete layer and then left to flow under gravity over the surface of the top concrete layer. As the slurry flows over the surface of the concrete, it spreads out evenly over the surface, filling any voids and undulations in the concrete surface, and provides a level coating on the top concrete layer. The slurry is then left to dry and form a hard coating. The time required for the slurry to dry and form a hard coating depends upon how much water is in the composition and the drying conditions. However, it typically requires at least 12 hours before the coating is sufficiently hard for it to be walked on, and it may require at least another 12 hours before the coating is sufficiently dry for a floor covering to be laid on top of it.

The amount of time required for the self-levelling floor composition to dry and harden before a floor covering may be applied is often considered inconvenient for builders, particularly as it may delay their ability to finish a job.

U.S. Pat. No. 4,157,264 discloses a calcium sulfate hemihydrate plaster slurry comprising a set-inhibiting agent, selected from water-soluble polymers and copolymers of acrylic acid and salts thereof having molecular weights within the range 2,000 to 75,000. The slurry is capable of rapid setting upon admixture with a promoter, selected from the water-soluble salts of iron, copper and aluminium. The slurry is described to useful as a grouting material, e.g. for grouting dowels in rock, or in the preparation of wall plasters.

U.S. Pat. No. 5,746,822 discloses a cementitious composition of the setting type which can be kept in a ready-mixed state and which can be caused to set and harden upon introduction of an accelerator with reproducibility and set time predictability. The cementitious base composition contains calcium sulfate hemihydrate as a principle filler and certain non-calcium bearing phosphate additives which prevent setting action in the presence of water. An accelerator, such as zinc sulfate, may be added to the ready-mixed cementitious composition to initiate the setting action. The composition is described to be useful as jointing compounds for finishing seams between gypsum drywall panels, firestop compounds, ornamental and casting plasters, spackling compounds, and basecoat and finishing plasters.

U.S. Pat. No. 5,779,786 discloses a settable, ready-mixed joint compound composition, suitable for use in concealing joints between edges of adjacent wallboard panels. The composition comprises calcium sulfate hemihydrate, sufficient water to form a slurry with said calcium sulfate hemihydrate, and a set retarding agent, comprising a polymer having a molecular weight in the range of from 1700 to 6700 and including acrylic acid and acrylamide monomer units.

EP-A-1316537 discloses a two-pack composition comprising component A, which comprises gypsum an alkaline polymer resin and an hydration inhibitor, and component B, which comprises an acidic polymer resin, a filler, and an activator. The compositions are described to be useful as coatings for sandwich panels, moulding, duct-work, piping and cladding systems, traffic paint applications and other transportation industry safety coatings. The compositions are also useful as reinforcing membranes for use in subterranean mines.

European patent application No 02292326.2, filed 20 Sep. 2002, discloses a similar composition as disclosed in EP-A-1316537 but includes an alkaline agent in component A.

None of the above prior art references disclose or suggest the possibility of using the setting-inhibited gypsum compositions in or as self-levelling floor compositions.

DE-A4404 182 discloses a two-pack cementitious composition consisting of a first pack comprising gypsum and water which is stable in the fluid state and which can be set upon addition of an hydration activator, and a second pack comprising an hydration activator. When the two packs are combined, e.g. at the building site, they form a self-levelling floor composition.

It is an object of the present invention to provide a self-levelling floor composition which is capable of hardening and drying sufficiently for it to be covered by a floor covering within 12 hours after application, preferably within 6 hours after application. It is another object of the present invention to reduce by at least 12 hours, preferably by at least 18 hours, the amount of time required for a self-levelling floor composition to harden and dry sufficiently for it to be covered by a floor covering.

In one aspect of the present invention, there is provided the use, for levelling a floor, of a two-pack cementitious composition consisting of i) an alkaline component comprising gypsum, an aqueous alkaline polymer composition, water and a hydration inhibitor, which is stable in a fluid state and which can be set and hardened upon the addition of an hydration activator, and ii) an acidic component comprising an acid-soluble hydration activator, said components when combined forming a self-levelling floor composition.

In another aspect of the present invention, there is provided a method of levelling a floor, which method comprises:

a) mixing together the two components of a two-pack cementitious composition consisting of i) an alkaline component comprising gypsum, an aqueous alkaline polymer composition, water and a hydration inhibitor, which is stable in a fluid state and which can be set and hardened upon the addition of an hydration activator, and ii) an acidic component comprising an acid-soluble hydration activator, to form a self-levelling floor composition, b) applying a sufficient amount of the two-pack cementitious composition to the floor, and c) allowing the self-levelling floor composition to harden and dry.

In yet another aspect, there is provided the use in the preparation of a fast-drying self-levelling floor composition of a two-pack cementitious composition consisting of i) an alkaline component comprising gypsum, an aqueous alkaline polymer composition, water and a hydration inhibitor, which is stable in a fluid state and which can be set and hardened upon the addition of an hydration activator, and ii) an acidic component comprising an acid-soluble hydration activator.

When the acid component is mixed in or comprises water or an aqueous phase, it has a pH which is sufficiently low such that at least a part of the acid-soluble hydration activator is dissolved in said water or aqueous phase.

The alkaline component may also comprise an alkaline agent.

One or both of said alkaline and acidic components may contain an inert filler. Preferably, the acidic component comprises an inert filler.

The composition formed by mixing the alkaline and acidic components must have the necessary viscosity properties expected of a conventional self-levelling floor composition i.e. it must be sufficiently fluid on application to the floor for it to flow, under gravity, over the top concrete layer of the floor and fill any voids or undulations therein, thereby to produce a level coating over the floor. In order for the mixture of the alkaline and acidic components to achieve these fundamental flow properties and, indeed, for the said mixture and/or the alkaline and acidic components thereof to have any other desirable properties, one or both of said alkaline and acidic components may contain one or more other ingredients in order to aid processing, handling, formulating and/or application of the components or mixture. Such ingredients, which are traditionally utilized in coating compositions and/or self-levelling floor compositions, may include rheology modifiers, plasticisers, anti-foamers, surfactants, set-control agents, coalescents, natural and synthetic fibres, and expansion agents.

The gypsum used in this invention can be selected from a wide variety of settable forms of calcium sulfate which include anhydrous calcium sulfate and/or chemical gypsum, commonly called synthetic gypsum, as well as calcium sulfate hemihydrate. There are primarily two types of hemihydrate ($CaSO_4 \cdot \frac{1}{2}H_2O$) which are commercially available and conventionally referred to as the alpha and beta forms. The alpha hemihydrate is conventionally prepared by placing lump gypsum into an autoclave and calcining it at controlled superatmospheric pressure in the presence of steam. In contrast, beta hemihydrate is prepared by heating the dihydrate at atmospheric pressure in either a kettle or rotary calciner. Although the physical appearances of these two types of gypsum can be the same, they differ in the water/gypsum ratio required to produce workable products. The dissimilarity in the physical nature of the gypsum particles of the two forms arises from the differences in their respective surface properties. The larger alpha crystals have low water absorption and smaller surface area per unit weight. This translates into a lower water requirement to cause setting up, or curing, of the gypsum. The lower the weight of water in proportion to the weight of dry gypsum solids, the greater the strength of the final product after curing. The amount of gypsum used in the formulation of the alkaline component is preferably from 50 to 80 wt %, e.g. 50 to 78 wt %, preferably 60-70 wt %, based on the total weight of said component.

The alkaline component includes an alkaline polymer which is preferably an aqueous alkaline polymer composition, i.e. an aqueous polymer emulsion, dispersion or solution which is provided at a pH of 7 or higher. The aqueous alkaline polymer corn positions useful in this invention typically comprise addition polymers of ethylenically unsaturated monomers and include vinyl polymers and polymers of acrylates and methacrylates. Examples of polymerized monomers can include methyl acrylate, butyl acrylate, ethyl acrylate, methyl methacrylate, ethyl methacrylate, butyl methacrylate, hexyl methacrylate and lauryl methacrylate. Other monomers which can be used are styrene, vinyl acetate, vinyl versatate and vinyl chloride. Copolymers of two or more of these monomers can be employed as desired depending on the properties required in the final composition. The term "copolymer" as used herein is intended to include polymer blends as well as true copolymers. The polymer can be an emulsion polymer or it can be in the form of a water redispersible powder. Preferred are copolymers formed by emulsion polymerization, which can contain about 35 to 65% solids, by volume.

When selecting monomers or monomer blends for use in the polymer of the aqueous alkaline polymer composition, it is necessary to keep in mind the various properties imparted by each monomer. For example, polymerized styrene is alkali-resistant and water resistant, but its long term aging properties are not very good. For some applications, this negative feature can be an acceptable accommodation. Polymerized vinyl acetate has low water resistance but in certain applications, e.g., when the composition is applied to a subterranean surface which is substantially devoid of moisture, this can be acceptable. Acrylate and methacrylate polymers have good long term aging properties and good water and alkali resistance. The amount of polymer present in the alkaline component is preferably from 20 to 50 wt %, e.g. 20 to 49.95 wt %, based on the total weight of the alkaline component.

One of the properties which should be considered in the choice of a polymer is the "glass transition temperature" or "Tg" as measured by differential scanning calorimetry (DSC) using the mid-point in the heat versus temperature transition as the Tg value, using a heating rate for the DSC measurement of 20° C./minute. The preferred Tg for the alkaline polymer is in the range of −20° C. to 50° C., with a more preferred range being from 0° C. to 40° C. An example of a suitable alkaline copolymer is PRIMAL™ AC-339, which is an acrylic polymer having a Tg=26° C., available from the Rohm and Haas Co. of Philadelphia, Pa.

The alkaline component may include an alkaline agent. The alkaline agent is preferably selected from amines and alkaline earth bases. Suitable amines include ammonia, primary amines, secondary amines, and tertiary amines. Suitable alkaline earth bases include the hydroxide, carbonate, bicarbonate, and acetate salts of alkaline metals. Preferred are aminomethyl propanol and the hydroxides of calcium, magnesium, and barium. More preferred is calcium hydroxide. The alkaline agent is added in an amount sufficient to provide said component at a pH of 7 or higher.

Typically the alkaline agent is present at a level of 0.05 to 1 wt %, preferably 0.1 to 0.3 wt % based on the total weight of said component.

The alkaline component includes a hydration inhibitor to keep the composition in a fluid state and prevent the setting of the gypsum before it is mixed or otherwise contacted with the acidic component. The hydration inhibitor is typically a polymer or copolymer of a polycarboxylic acid. Examples include polymers and copolymers of acrylic acid methacrylic acid, itaconic acid and fumaric acid. Copolymers of acrylic acid or methacrylic acid with an alkyl ester or amide of acrylic acid or methacrylic acid and polycarboxylic acid anhydrides are preferred hydration inhibitors. The polymeric hydration inhibitor can conveniently be in the form of the sodium or ammonium salt. A preferred hydration inhibitor is polyacrylic acid homopolymer or a copolymer comprising, as polymerized units, from 50 to 99.9% acrylic acid and 0.1 to 50% acrylamide, by weight e.g. 95 to 98% acrylic acid and 2 to 5%, by weight, of acrylamide. Most preferably, the hydration inhibitor is polyacrylic acid. An example of a suitable hydration inhibitor is OROTAN™ 963, sold by the Rohm and Haas Co., Philadelphia, USA. Other materials suitable for use as hydration inhibitors include phosphates or phosphonates, for example as disclosed in U.S. Pat. No. 5,746,822. An example of such a phosphate is potassium tripolyphosphate. The hydration inhibitor is preferably incorporated into the alkaline component in an amount of from 0.1 to 2.0 wt %, based on the total weight of said component.

In one embodiment of the present invention, the acidic component of the two-pack composition includes an aqueous acidic polymer composition, a filler, and an activator.

Preferably, the polymer employed in the acidic component is an aqueous acidic polymer composition, i.e. an aqueous polymer emulsion, dispersion or solution having a pH of less than 7. Polymers useful in this invention are typically addition homo- or co-polymers of ethylenically unsaturated monomers and other ethylenically unsaturated monomers such as vinyl polymers and polymers of acrylates and methacrylates. Examples of polymerized monomers can include methyl acrylate, butyl acrylate, ethyl acrylate, methyl methacrylate, ethyl methacrylate, butyl methacrylate, hexyl methacrylate and lauryl methacrylate. Other monomers which can be used are styrene, vinyl acetate, vinyl versatate and vinyl chloride. Copolymers of two or more of these monomers can be employed as desired depending on the properties required in the final composition. The polymer employed in the acidic component may be an acidic polymer. Examples of acidic monomers useful in the preparation of acidic polymers are ethylenically unsaturated carboxylic, sulfinic and sulfonic acid monomers including e.g. Acrylic acid, methacrylic acid, itaconic acid and maleic acid. The term "copolymer" as used herein is intended to include polymer blends as well as true copolymers. The polymer can be an emulsion, dispersion or suspension polymer or it can be in the form of a water redispersible powder. Preferred are copolymers formed by emulsion polymerization, which can contain about 35 to 65% solids, by volume.

When selecting monomers or monomer blends for use in preparing the polymer employed in the acidic component of the two-pack composition, similar guidelines to those included for the polymer of the alkaline component pertain. The amount of polymer present in the acidic component is preferably from 20 to 99 wt %, based on the total weight of the component.

The preferred Tg for the polymer in the acidic component is in the range of $-20°$ to $5020$ C., with the most preferred range being from 0 to $40°$ C. An example of a suitable aqueous acidic copolymer composition is PRIMAL™ HA-16, which is an aqueous acidic acrylate/acrylamide polymer composition having a Tg $=35°$ C., available from the Robin and Haas Co. of Philadelphia, USA.

The acidic component of the two-pack composition may include a filler. Examples of suitable fillers, also called extenders, are sand, mica, silica, alumina and fly ash, with silica and/or alumina being preferred. The filler is typically present in an amount of 40-80%, preferably 60-75%, by wt based on the total weight of said acidic component.

An acid-soluble activator is included in the acidic component of the two-pack composition. The amount of acid-soluble activator required will be related to the amount of alpha gypsum and hydration inhibitor present in the composition. The activator will preferably be added in an amount of from 0.1 to 6.0 weight percent, and more preferably from 0.1 to 4.0 weight percent, based on the total weight of the acidic component when other components e.g. the polymer and filler are present. Suitable activators include metallic salts which can provide acidic cations. Preferable metallic salts are aluminum sulfate, calcium sulfate, ferric sulfate, zinc sulfate and ferric chloride. The most preferred activator for this composition is aluminum sulfate.

The alkaline and acidic components of the two-pack composition are preferably each fluid dispersions in an aqueous medium. By a "dispersion in an aqueous medium" is meant that the constituents of the alkaline and acidic components are admixed with a medium which is a single continuous phase containing greater than 50% water by wt based on the weight of the medium. It is contemplated that such constituents may be soluble or partially soluble in the aqueous medium and will dissolve and the balance of the material will be dispersed in the aqueous medium. The alkaline and acidic components, when both in the fluid state, are typically combined at a volume ratio of from 95:5, respectively, to 5:95. The optimum ratio can be determined by considering factors such as the surface to be treated, the time required for cure, equipment capability, and other processing concerns.

The total amount of water employed in the two-pack composition is preferably that amount which is considered just sufficient for the gypsum to fully hydrate, though compositions comprising e.g. up to 100% or more in excess of this amount may also be suitable. For example, an excess of water can sometimes give beneficial flow properties to the compositions. Self-levelling floor compositions containing this amount of water will set rapidly and form hard coatings. Any water present which is in excess of the amount used to fully hydrate the gypsum may affect the hardness of the dry coating and will take longer to dry, as the excess water has to be removed by evaporation. On the other hand, if too small a quantity of water is used, then the hardness of the dry coating may be affected. The appropriate amount of water to use in the two-pack composition can be readily determined by a person skilled in the art. Preferably, all required water is obtained from the aqueous polymer compositions, though any extra water required may be added to either of the two components.

Other ingredients can be added to the composition, many of them can be added to either the alkaline or acidic components or to the admixture, in order to aid processing, handling or formulating. Ingredients which are traditionally utilized in coatings include anti-foamers, surfactants, rheology modifiers, set control agents, coalescents, natural and synthetic fibers, and expansion agents.

Compositions which are suitable for use as self-levelling floor compositions are described in, for example, EP-A-1316537 and European patent application No 02292326.2, filed 20 Sep. 2002, the contents of which are incorporated herein by reference.

When the admixture is applied to a floor it is typically from 0.1 to 10 mm thick, preferably from 0.5 to 5 mm and most preferably from 1 to 2 mm. Sometimes, for example when burying underfloor heating pipes or cables in the floor, it may be necessary to apply the self-levelling floor composition in greater thicknesses e.g. up to 50 mm or more. Even at these greater thicknesses, the compositions set up and dry quickly, but it will be appreciated that these times may be significantly higher than for the conventional thinner coatings.

Application of the mixed composition is most conveniently done by use of pressurized spray applicators. The alkaline and acidic components can be fed via separate hose or duct systems to either a single or dual applicator nozzles, where both are sprayed either simultaneously, as through dual nozzles, or as a blend, via a single nozzle, onto the substrate.

A coating formed by the application of the mixture settles under gravity to form a level surface coating over top cement layer. Further, it may provide a coating which is substantially impervious to moisture. A coating thickness in the range of 1 to 2 mm will, depending upon atmospheric conditions and the amount of water and initiator in the applied composition, set up in less than 1 hour, preferably in less than 10 minutes, more preferably in less than 3 minutes. Once the self-levelling floor composition has set, it preferably dries sufficiently for a floor covering to be applied in under 12 hours, more preferably in under 6 hours, and even more preferably in under 1 hour.

The setting and drying of the self-levelling floor composition in under 7 hours is highly advantageous: it enables the floor to be covered with a floor covering much quicker than with conventional self-levelling floor compositions. In addition, the use of alkaline and acidic polymers provides a most convenient means to provide alkalinity and acidity to the components. Other benefits derived from the use of the composition include one or more of: improved abrasion resistance, improved water resistance, improved adhesion to base substrate, the set coating is less brittle and therefore less susceptible to cracking, and does not rely on the provision of on-site water.

The following examples are presented to illustrate the invention and the results obtained by the test procedures.

Sample Preparation:

A self-levelling floor composition was prepared from a two-pack composition comprising Component A and Component B (as described in European patent application No 02292326.2, filed 20 Sep. 2002). The self-levelling floor composition was prepared by adding 450 g of Component B to 1000 g of Component A, then mixing with a mechanical mixer for 1 minute. The fluid mixture, which had a Brookfield viscosity on spindle #4 of 25,000 cPoise at 1.5 rmp, was cast into silicone molds of 2.5 cm cubes and also molds of 12 cm×1.8 cm×1.2 cm flexural bars, which were then left to cure for 45 minutes before demolding and storage in a controlled temperature room (CTR) at 23° C./50% relative humidity. The remainder of the unset composition was applied, as a self-levelling floor composition to provide a 3 mm thick coating, onto cured concrete, allowed to set, and then transferred to the CTR.

Component A comprises the following components.

| Component | g per 100 g Component A |
|---|---|
| Alkaline acrylic binder | 13 (polymer solids) |
| Water* | 16 |
| Alpha gypsum (CaSO$_4$ · 0.5 H$_2$O) | 68 (solids) |
| Polyacrylic acid (retarder) | 0.2 (polymer solids) |
| Calcium Hydroxide | 0.05 (solids) |
| Surfactants, defoamer, coalescent | <1 each (solids) |

*Water includes that from the acrylic binder (a polymer emulsion), from the additives which are supplied in water, and from an additional 1 g of water added to the batch.

Component B comprises the following components.

| Component | g per 100 g Component B |
|---|---|
| Acidic acrylic binder | 12 (polymer solids) |
| Water* | 19 |
| Alumina trihydrate | 66 (solids) |
| Aluminum Sulfate, octadecahydrate | 1.3 (solids) |
| Surfactants, defoamer, coalescent | <1 each (solids) |

*Water includes that from the acrylic binder (a polymer emulsion), from the additives which are supplied in water, and from an additional 4 g water added to the batch.

When the two components A and B are mixed as instructed above, i.e. 1000 g of Component A with 450 g of Component B, the mixture comprises 16.9% water. Hydration and setting of the gypsum consumes about 50% of this water within 45 minutes of preparing the mixture.

Strength Testing:

At various times after the initial mixing, sets of 3 cubes were subjected to compressive strength testing according to ASTM C109. Sets of 3 bars were subjected to flexural strength testing according to ASTM C78-02. Bond strength of the self levelling floor composition to concrete was tested according to ASTM D4541 on 3 separate areas of the coated concrete, using an Elcometer 106 Adhesion Tester, having a range of 0-3.5 MPa.

| Age: | 4 hours | 24 hours | 7 days |
|---|---|---|---|
| Compressive: | 4.7 MPa | 6.0 MPa | 8.6 MPa |
| Flexural: | 1.7 MPa | 2.1 MPa | 6.6 MPa |
| Bond Strength: | — | 1.3 MPa | >1.8 MPa* |

*In the 7 day test, the epoxy used to a bond the test dolly to the self levelling floor composition failed at 1.8 MPa; the bond between self levelling floor and concrete was undamaged.

Dry Testing

It will be observed that the self-levelling floor composition, when applied as a 3 mm coating onto the concrete, will readily form a level top surface. Further, the coating will be sufficiently dry 12 hours after application for a floor covering to be applied on top of the dry composition.

The invention claimed is:

1. A method of levelling a floor, which method comprises:
   a) mixing together the two components of a two-pack cementitious composition consisting of:

i) an alkaline component comprising gypsum, an alkaline aqueous polymer emulsion, and a hydration inhibitor, which is stable in a fluid state and which can be set and hardened upon the addition of an hydration activator, and
ii) an acidic component comprising an acid soluble hydration activator, to form a self-levelling floor composition, b) applying an amount of the two-pack cementitious composition to the floor in an amount sufficient to level the floor, and c) allowing the self-levelling floor composition to harden and dry.

2. The method of claim 1, wherein the alkaline component comprises gypsum, an alkaline aqueous polymer emulsion, and an hydration inhibitor; and the acidic component comprises an acidic aqueous polymer emulsion, a filler, and an activator.

3. The method claimed in claim 1, wherein step a) and step b) take place successively.

4. The method claimed in claim 1, wherein step a) and step b) take place simultaneously.

5. The method claimed in claims 1, wherein the amount of composition applied to the floor in step b) is sufficient to form a coating of up to 50 mm thick on the floor.

6. A method of levelling a floor, which method comprises:
a) mixing together the two components of a two-pack cementitious composition consisting of:
iii) an alkaline component comprising gypsum, an alkaline aqueous polymer composition, and a hydration inhibitor, which is stable in a fluid state and which can be set and hardened upon the addition of an hydration activator, and
iv) an acidic component comprising an acid soluble hydration activator, to form a self-levelling floor composition, b) applying an amount of the two-pack cementitious composition to the floor in an amount sufficient to level the floor, and c) allowing the self-levelling floor composition to harden and dry sufficiently for the floor to be covered by a floor covering within 12 hours after applying the two-pack cementitious composition to the floor.

7. The method claimed in claim 6, wherein the composition hardens and dries sufficiently for the floor to be covered by a floor covering within 7 hours after applying the two-pack cementitious composition to the floor.

8. The method claimed in claim 6, wherein the amount of composition applied to the floor in step b) is sufficient to form a coating of 1 to 2 mm, and further wherein the composition sets up in less than one hour.

9. The method claimed in claim 8, wherein the composition sets up in less than 10 minutes.

10. The method claimed in claim 8, wherein the composition sets up in less than 3 minutes.

\* \* \* \* \*